UNITED STATES PATENT OFFICE.

WILHELM HERRMANN AND MARTIN MUGDAN, OF NUREMBERG, GERMANY, ASSIGNORS TO CONSORTIUM FÜR ELEKTROCHEMISCHE INDUSTRIE G. M. B. H., OF NUREMBERG, GERMANY.

PROCESS FOR THE MANUFACTURE OF ALDOL.

1,220,746. Specification of Letters Patent. Patented Mar. 27, 1917.

No Drawing. Application filed September 3, 1913. Serial No. 787,996.

*To all whom it may concern:*

Be it known that we, WILHELM HERRMANN and MARTIN MUGDAN, residing at Nuremberg, Germany, have invented certain new and useful Improvements in Processes for the Manufacture of Aldol, of which the following is a specification.

In almost all of the known processes for the manufacture of aldol the condensation of the aldehyde is effected by an aqueous salt solution and in this way an aqueous solution of aldol is obtained as the final product from which the aldol must be isolated by shaking with a solvent usually ether which is an inconvenient and costly procedure.

According to the present invention experiments have therefore been made to work out a process in which no water shall be used at all. It has already been attempted to employ the condensing agent in the dry state, thus, for example, dry alkali carbonate has been proposed, yet in this case owing to the large quantity originally used, it was necessary to effect the isolation of the aldol by shaking with ether, and to wash with water in order to remove the potash. Further experiments with condensing agents with the exclusion of water led to no appreciable formation of aldol, and, in fact, when using alcoholate, for example, total resinification took place.

The surprising fact has now been discovered that this tedious method of operation, according to which both time and material are wasted, can be overcome, and that the aldol can be obtained in the anhydrous form directly by distillation from the product of reaction if the acetaldehyde is treated with certain condensing agents in the dry state in very small quantities.

It is surprising that this is possible, owing to the tendency of aldehyde and aldol to resinification and decomposition, and it is also remarkable that quite small quantities of certain condensing agents can effect the aldol condensation.

Catalysts of this kind have been discovered in the alkali or alkaline earth metals, their amalgams or alloys, their products of reaction with aldehyde and their other compounds soluble in aldehyde, such as, for example, alcoholates, cyanids, etc.

It has been found sufficient to employ not more than 5% by weight of these substances in the dry state, upon the amount of acetaldehyde which is subjected to aldol condensation; usually far smaller quantities will suffice.

Example 1: To 1,000 parts of acetaldehyde are added in portions 70 parts of a 2% calcium amalgam (corresponding to 1.4 parts of metallic calcium); the mixture is preferably stirred. Gas is evolved, and at first a salt begins to separate out which later goes into solution. The heat evolved by the reaction is removed by cooling. The reaction is over after some hours when the contents of the flask consist of a viscous liquid, which, however, is quite water-clear; the product can be directly subjected to distillation *in vacuo* when a good yield of aldol is obtained as a water-clear distillate. The flask contains a slight residue together with the mercury which was contained in the amalgam which can then be recovered as a metallic regulus.

Example 2: 1 part of solid powdered potassium cyanid is added in portions to 1000 parts of dry aldehyde. The reaction occurs with vigorous evolution of heat; a compound of the potassium cyanid with the aldehyde separates out first, and then again dissolves as in Example 1; a water-clear product is obtained from which the aldol can be obtained by distillation *in vacuo*.

For the sake of brevity we will use the term "light metals" as comprising the alkali or alkaline earth metals.

We claim as our invention—

1. In the process for the manufacture of aldol by treating acetaldehyde in absence of water with not more than 5% of a suitable dry catalyst as condensing agent capable of yielding on reaction a compound of a light metal, the step which consists in separating the aldol from the condensing agent by direct distillation *in vacuo*.

2. In the process for the manufacture of aldol by treating acetaldehyde in absence of water and of other solvents with not more than 5% of a suitable dry catalyst as condensing agent capable of yielding on reaction a compound of a light metal, the step which consists in separating the aldol from the condensing agent by direct distillation *in vacuo*.

3. The process for the manufacture of aldol which comprises treating acetaldehyde in absence of water with less than 1% of a dry catalyst as condensing agent, said catalyst being such as to yield on reaction a compound of a light metal, and separating the aldol so formed from said catalyst by direct distillation *in vacuo*.

4. The process for the manufacture of aldol which comprises treating acetaldehyde in absence of water with less than 1% of a dry light metal as condensing agent, and separating the aldol so formed by direct distillation *in vacuo*.

5. The process for the manufacture of aldol which comprises treating acetaldehyde in absence of water and in presence of less than 1% of a catalyst consisting of a compound of a light metal soluble in acetaldehyde, and separating said aldol from said catalyst by direct distillation *in vacuo*.

6. In the process for the manufacture of aldol by treating acetaldehyde in absence of water with less than 5% of a dry catalyst as condensing agent, the step which consists in separating the aldol by direct distillation *in vacuo*, the temperature and the initial percentage of the catalyst being so controlled that no considerable resinification takes place.

7. The process of condensation which comprises subjecting acetaldehyde to the action of an alkali-forming metal to form acetaldol, the metal present being substantially one tenth of one per cent. of the acetaldehyde.

In testimony whereof we affix our signatures in presence of two witnesses.

WILHELM HERRMANN.
MARTIN MUGDAN.

Witnesses:
MARTIN ERHARD,
WOLFRAM HAEHNEL.